United States Patent Office 3,050,056
Patented Aug. 21, 1962

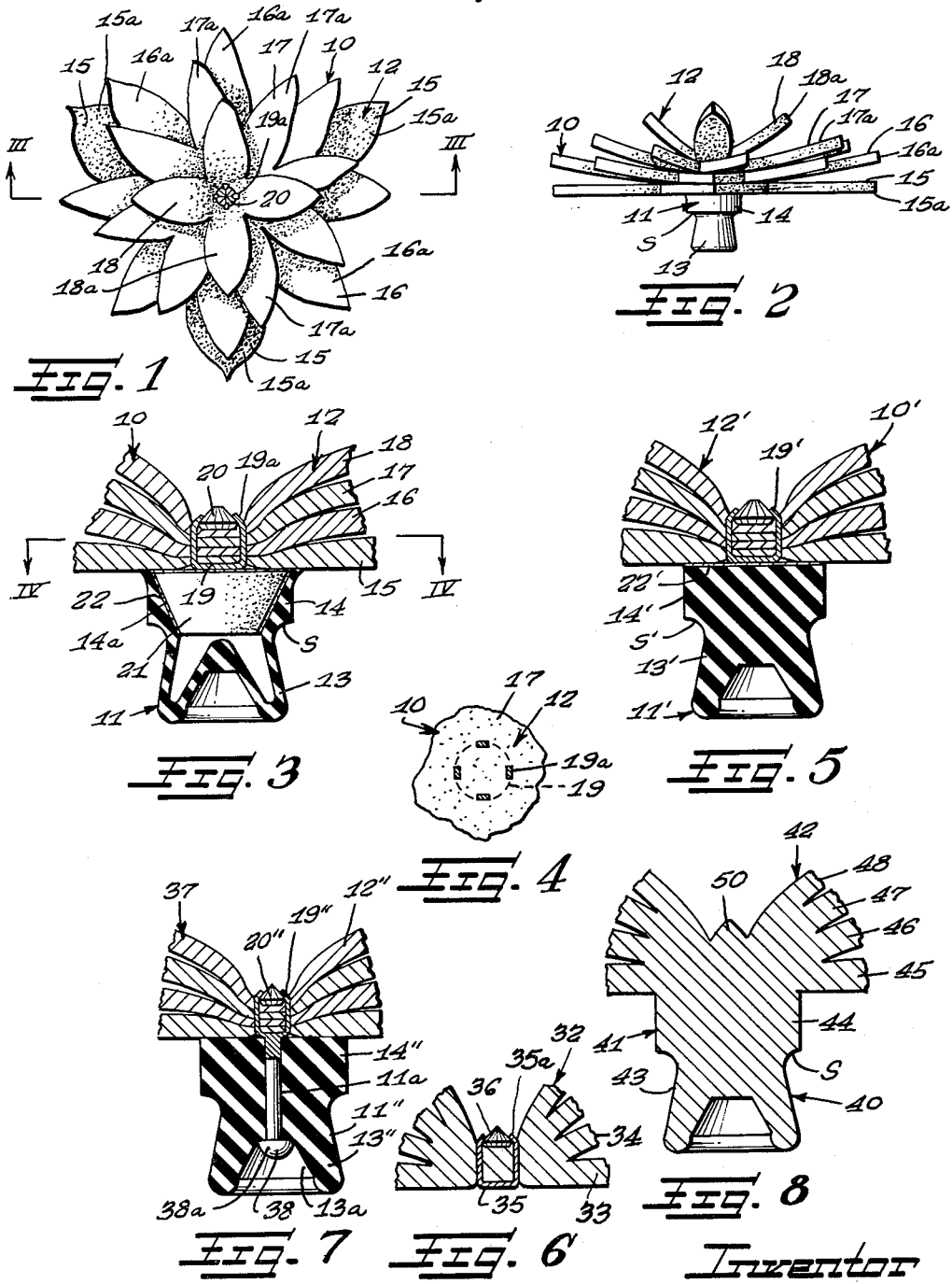

3,050,056
SEA-SPRITE EAR PLUGS
Carol M. Dressler, 2313 W. Diversey, Chicago 47, Ill.
Filed Apr. 22, 1959, Ser. No. 808,179
3 Claims. (Cl. 128—151)

The present invention relates generally to new and improved ear plug devices each of which is not only adapted to prevent water from entering the ear and the like, but in addition, is adapted to provide the ear with an utilitarian type of ornamentation.

The present ear plug devices differ from former constructions in that they are adapted to be both functional and decorative. The present ear plugs are constructed to continue to serve the main functions for which ear plugs were originally developed in being adapted to prevent water from entering the ears of swimmers and/or being adapted to reduce the effect of noises for those who might otherwise be distracted and/or bothered by the same.

According to the present invention each of the ear plugs is provided with means comprising ornamental structure at its outer end remote from its opposite end which is adapted to be projected into the ear canal which means is adapted to conceal the presence of the ear plug in the human ear. The means or ornamental structure is functional in that it provide handle means to aid in the assembly and removal of the ear plug from the ear. The ornamental structure is further functional in that it provides means for concealing the portion of the ear plug that is projected into the ear thereby improving the overall appearance of the ear and the ear plug.

The new and improved ear plug devices each are especially adapted for use by women who might frown on the use of a conventional ear plug device as contrasted to the new and improved ear plug device since the new and improved ear plug devices are both attractive and serviceable. The ear plug devices, according to the present invention, are preferably adorned by flower structure made of a suitable crush-proof waterproofed, or water-repellent material. The material may be one of a number of different types of rubber, such as foam rubber or a synthetic plastic or other suitable materials. The flower structures may be manufactured in a variety of colors and designs and may be a very attractive and useful addition to any woman's wardrobe.

An important object of the present invention relates to the development of new and improved ear plug devices which are not only adapted to serve their usual functions, but in addition, are adapted to be highly attractive and more easily insertable and removable from the ear.

Another important object of the present invention relates to the provision of new and improved ear plug devices each having flower structure on it which may be manufactured from a variety of colors and designs so as to be very attractive and useful addition to a woman's wardrobe.

Yet another important object of the present invention relates to the manufacture of new and improved ear plug devices which may be manufactured on a large production basis at a minimum cost.

According to the general features of the present invention, ear plugs of different types are each adapted to be provided with a flower structure which flower structure may be manufactured as a one-piece unit and attached to an ear plug or which flower structure may be manufactured together with the ear plug as a one-piece unit or which flower structure may comprise a series of pieces which are adapted to be attached to one end of an ear plug.

According to still other features of the present invention, the flower structure on the ear plug may include a series of leaves and flower petals and may have the center area of the petals ornamented by a flower core simulating area or rhinestone.

Still another important feature of the present invention relates to an ear plug having a reduced inner end portion for insertion into the canal and the inner ear, an intermediate portion connected at one end to the reduced end portion for disposition in the area defined by the outer ear, and means comprising an outer end portion connected to the intermediate portion at its opposite end for concealing the reduced and intermediate portions when the reduced and intermediate portions are mounted on an ear, the means comprising a flower structure which is adapted to ornament the ear and operate as a handle which not only aids in the insertion and removal of the ear plug from the ear, but in addition, conceals the reduced and intermediate portions so as to conceal the identity of the ear plug and to render the ear more attractive.

Other objects and features of the present invention will more fully become apparent in view of the following detailed description taken in conjunction with the accompanying drawings illustrating therein several embodiments and in which:

FIGURE 1 is a top plan view of an ear plug, according to the features of the present invention;

FIGURE 2 is a side elevation of the ear plug shown in FIGURE 1;

FIGURE 3 is a fragmentary cross-sectional view taken substantially on the line III—III looking in the direction indicated by the arrows, as seen in FIGURE 1;

FIGURE 4 is a fragmentary cross-sectional view taken substantially in the line IV—IV looking in the direction indicated by the arrows, as seen in FIGURE 3;

FIGURE 5 is a fragmentary cross-sectional view of another modified type of ear plug;

FIGURE 6 is a fragmentary cross-sectional view of a modified type of flower structure which is adapted to be mounted upon an ear plug;

FIGURE 7 is a fragmentary cross-sectional view of still another modified ear plug; and FIGURE 8 is a fragmentary cross-sectional view of yet another modified type of ear plug.

As shown on the drawings:

The reference numeral 10 in FIGURES 1–4 indicates generally a first form of ear plug, illustrating certain of the principles of my invention. The ear plug 10 is provided with one end portion 11 for insertion and assembly in the ear. The ear plug is further provided with means comprising an outer opposite end portion or outer end portion 12 connected to the one end portion 11 for concealing the one end portion when the one portion is mounted in the ear.

The one end portion 11 includes a reduced portion 13 for insertion into the ear canal in the ear of a human being. The one end portion 11 further includes an intermediate portion 14 which is adapted for disposition in the area defined by the outer ear. The junction of the reduced and intermediate portions is indicated general at S and provides shoulder means to limit the extent which the one end portion 11 may be inserted into the canal of the ear.

The one end portion 11, as shown in FIGURE 3, is more or less of a conventional hollow-type ear plug construction which is suitably manufactured from a suitable material such as rubber, a suitable synthetic plastic material, and the like.

The outer opposite end portion or outer end portion 12 is here preferably illustrated as comprising flower structure which flower structure is not only adapted to ornament the ear but is also adapted to conceal the one end portion 11 as well as being adapted to provide handle means to aid in the assembly and removal of the ear plug 10 from the ear.

The flower structure 12 includes a leaf simulating piece 15 having a series of leaves or leaf simulating portions 15a. The flower structure 12 further includes a series of petal simulating pieces 16, 17 and 18 which have a series of petals or petal simulating portions 16a, 17a and 18a.

A clamp means or clip 19 including prongs 19a is provided for securing the leaf and petal pieces 15, 16, 17 and 18 in assembly together and in assembly with a flower simulating core portion or rhinestone 20. After the leaf and petal pieces have been stacked on top of one another the prongs 19a may be projected through the pieces by any suitable means in such a manner that the pieces are secured in assembly together with the flower core simulating portion or rhinestone 20.

The flower core simulating portion or rhinestone 20 may be colored the same color as the flower or a contrasting color, as desired. Where the means comprising the outer end portion constitutes a flower structure, the flower structure may be of an artificial design or it may resemble a flower type which exists in nature.

Where the one end portion 11 is of a hollow type construction suitable means in the form of a circular piece 21 of airfoam, cork, rubber or any suitable material may be used as the base of the flower structure and be adapted for disposition within a recessed area 14a provided in the intermediate portion 14. The circular base piece 21 is preferably secured in assembly with the petal piece 15 prior to the time when the flower structure 12 is assembled with the intermediate portion 14. Suitable means may be utilized to secure the base piece 21 with the petal piece as well as with the recessed intermediate area 14a and such means is indicated at 22 as comprising a suitable adhesive. Where the flower structure including the petal piece 15 and the base piece 21 are comprised of a suitable material, these elements may be secured in assembly with the intermediate portion 14 by means of a heat sealing method.

In FIGURE 5 is shown a modified ear plug device 10' which is provided with one end portion 11' for disposition in the ear which portion is identical to the portion 11 except that it is manufactured from a solid piece of material of a suitable type such as rubber or synthetic plastic and the like. Means is attached to the one end portion 11' which constitutes an outer opposite end portion or outer end portion 12'. The opposite end portion 12' is preferably manufactured in the form of a flower structure and as here illustrated is identical to the flower structure 12. Clip means 19' is provided for securing the components of the flower structure 12' in assembly together. Suitable means as indicated at 22' is provided for securing the end portion 11' in assembly with the opposite end portion or flower structure 12'. The means 22' may comprise an adhesive or a heat seal may be utilized to secure the portions 11' and 12' in assembly together.

In view of the foregoing it should be apparent the end portion 11' is substantially identical to the end portion 11 and it should further be clear that the end portion 11' is provided with a reduced end portion 13' as well as an intermediate portion 14', for substantially the same purposes as stated previously.

Shown in FIGURE 6 is a modified type of flower structure indicated generally at 32 which flower structure is made as a one-piece unit. The one-piece flower structure 32 is provided with leaf simulating portions 33 as well as petal simulating portion 34. As here illustrated, the flower structure 32 is further provided with clamp means in the form of a clip 35 which extends through the center area of the flower structure and is provided with prongs 35a for securing a flower core simulating portion or rhinestone 36 in assembly therewith. If it is desired, the flower core simulating portion 36 may be formed integral with the flower structure 32 and the clip means 35 may be thereby eliminated. The flower structure 32 is adapted for assembly with either the hollow type of end portion 11 or the solid type of end portion 11'. If it is intended that the flower structure 32 be assembled with the hollow type of end portion 11, a flower base such as shown at 21 in FIGURE 3 may be formed integral with the flower structure 32 to aid in the assembly of the flower structure with the end portion 11. Where a flower base portion 21 is to be formed integral with the flower structure 32 the clip 35 is preferably omitted and the flower core simulating portion 36 is formed integral with the flower structure 32.

Shown in FIGURE 7 is still another modified type of ear plug, as indicated generally at 37. The ear plug shown in FIGURE 7 differs from the one shown in FIGURE 5 primarily in that a different type of means is shown for securing the components of the ear plug in assembly together.

The ear plug 37 includes one end portion 11" for disposition in the ear which portion is substantially identical to the end portion 11' except that it is provided with a tubular bore 11a which extends longitudinally along the axis of the end portion 11" through reduced and intermediate portions 13" and 14".

A fastener 38 may be molded or formed contemporaneous with the formation of the end portion 11" or it may be worked through the tubular passageway 11a after the end portion has been formed. In either case, the fastener 38 is provided with a head portion 38a which is lodged within a reduced recessed area 13a provided in the reduced end portion 13". The opposite end of the fastener 38 is provided with clamp means or a clip 19" which has prongs of the same general type as shown in FIGURE 5.

The ear plug 37 further includes means comprising an outer end portion connected to the intermediate portion 14" at its opposite end for concealing the reduced and intermediate portions when the reduced and intermediate portions are mounted on an ear, as indicated generally at 12". The means 12" is identical to the means 12 and 12', as shown in FIGURES 3 and 5. As illustrated, the means 12" comprises flower structure and a rhinestone 20" is adapted to be seated within a central area of the flower structure so that the prongs on the clip means 19" of the fastener 38 may be utilized to secure the components of the flower structure 12" as well as the rhinestone 20" in assembly together and in assembly with the one end portion 11".

Illustrated in FIGURE 8 is an ear plug 40 which is identical to the other ear plugs only it is formed in one piece from a suitable material such as rubber, synthetic plastic, and the like.

The ear plug 40 includes one end portion 41 for disposition in the ear as well as means comprising an outer end portion or opposite end 42 which preferably comprises flower structure for concealing the one end 41. In other words, the flower structure 42 is adapted to conceal reduced and intermediate portions 43 and 44 of the one end of 41.

The flower structure 42 includes leaf simulating portions 45 as well as petal simulating portions or petals 46, 47 and 48. Where the ear plug is formed as a one-piece unit, no clamp means is needed to secure the components in assembly. The ear plug 40 is provided with a flower core simulating portion 50 which is located at the central area of the flower structure 42.

In all forms of the invention means has been provided on an outer end portion of an ear plug which means is connected to intermediate and reduced portions of the ear plug and the means is adapted to conceal the reduced and intermediate portions when they are mounted on an ear and the means functions as a handle to aid in the assembly and removal of the ear plug from the ear. This means is here illustrated as a flower structure and is adapted to abut against the external shell structure of the ear in a highly attractive manner.

It will be understood that modifications and variations may be effected without departing from the scope of the novel concepts of the present invention.

I claim as my invention:

1. A combination ear ornament and swimming ear plug structure, the structure including an ear plug for insertion into an ear, and a non-metallic ear ornament secured directly to and in overlapping assembly with said ear plug at its outer end, the ear ornament being of such mass and peripheral dimension so as to comprise means for totally concealing both central and peripheral areas of said ear plug so the ear plug may be inconspicuously lodged within the ear canal, said ear ornament further providing means for ornamenting the ear as well as providing handle means to assist in inserting the ear plug structure in the ear canal and to assist in the removal of the ear plug from the ear canal, the ear ornament including a series of petal-like portions which are disposed in axially lapped relation with respect to one another along a longitudinal axis of the ear plug, a flower simulating core portion mounted on said ear ornament, and a clamp pierced through the petal-like portions securing the flower simulating core portion in assembly with the petal-like portions.

2. The structure of claim 1 further characterized by said series of petal-like portions each comprising a separate piece and with said clamp also providing means securing said pieces in assembly together.

3. A combination ear ornament and swimming ear plug structure, the structure including an ear plug for insertion into an ear, and a non-metallic ear ornament secured directly to and in overlapping assembly with said ear plug at its outer end, the ear ornament being of such mass and peripheral dimension so as to comprise means for totally concealing both central and peripheral areas of said ear plug so the ear plug may be inconspicuously lodged within the ear canal, said ear ornament further providing means for ornamenting the ear as well as providing handle means to assist in inserting the ear plug structure in the ear canal and to assist in the removal of the ear plug from the ear canal, the ear ornament including a series of petal-like portions which are disposed along a longitudinal axis of an ear plug, a flower simulating core portion mounted on said ear ornament and a clamp pierced through said ear plug as well as through the petal-like portions securing the ear plug, the petal-like portions and the flower simulating core portion all in unitary assembly together.

References Cited in the file of this patent

UNITED STATES PATENTS

| | | |
|---|---|---|
| 357,425 | Stickel | Feb. 8, 1887 |
| 1,406,425 | Stair | Feb. 14, 1922 |
| 2,215,198 | Silbert | Sept. 17, 1940 |
| 2,506,116 | Starkey | May 2, 1950 |
| 2,595,672 | Greenwood | May 6, 1952 |
| 2,622,358 | Reeves | Dec. 23, 1952 |
| 2,660,826 | Bennett | Dec. 1, 1953 |